(12) United States Patent
Laifenfeld et al.

(10) Patent No.: US 10,310,055 B2
(45) Date of Patent: Jun. 4, 2019

(54) DYNAMIC ADJUSTMENT OF RADAR PARAMETERS

(71) Applicant: GM Global Technology Operations LLC, Detroit, MI (US)

(72) Inventors: Moshe Laifenfeld, Haifa (IL); Igal Bilik, Rehovot (IL); Alexander Pokrass, Bat Yam (IL); Shahar Villeval, Tel Aviv (IL); Eli Tzirkel-Hancock, Ra'anana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 328 days.

(21) Appl. No.: 15/190,395

(22) Filed: Jun. 23, 2016

(65) Prior Publication Data

US 2017/0371028 A1   Dec. 28, 2017

(51) Int. Cl.
  *G01S 7/40*   (2006.01)
  *G01S 13/34*  (2006.01)
  *G01S 13/86*  (2006.01)
  *G01S 13/93*  (2006.01)

(52) U.S. Cl.
  CPC .......... *G01S 7/4004* (2013.01); *G01S 13/343* (2013.01); *G01S 13/865* (2013.01); *G01S 13/867* (2013.01); *G01S 13/931* (2013.01); *G01S 2013/9357* (2013.01)

(58) Field of Classification Search
  CPC .... G01S 7/4004; G01S 13/931; G01S 13/865; G01S 13/867
  USPC .......................................................... 342/52
  See application file for complete search history.

(56) References Cited

U.S. PATENT DOCUMENTS

| | | | | |
|---|---|---|---|---|
| 6,513,833 | B2* | 2/2003 | Breed ...................... | B60J 10/00 280/735 |
| 9,764,689 | B2* | 9/2017 | Burke .................... | G01S 13/931 |
| 2003/0060980 | A1* | 3/2003 | Prakah-Asante ..... | B60R 21/013 701/301 |
| 2015/0002332 | A1* | 1/2015 | Bi ............................ | G01S 7/35 342/200 |
| 2017/0124407 | A1* | 5/2017 | Micks ....................... | G06T 7/20 |

* cited by examiner

*Primary Examiner* — Frank J McGue
(74) *Attorney, Agent, or Firm* — Cantor Colburn LLP

(57) ABSTRACT

A control system and method dynamically adjust radar parameters of a radar system on a platform. The method includes obtaining inputs including platform parameters, wherein the platform parameters includes speed and braking duration, and obtaining a characterization of driving behavior based on the inputs. Modifying the radar parameters is based on the inputs and the characterization, wherein the modifying includes changing a maximum range, and providing alerts to a driver of the platform is based on the radar system.

18 Claims, 2 Drawing Sheets

DYNAMIC ADJUSTMENT OF RADAR PARAMETERS

FIELD OF THE INVENTION

The subject invention relates to the dynamic adjustment of radar parameters.

BACKGROUND

Radar systems may be used for detection and tracking in a variety of applications (e.g., vehicles (e.g., cars, construction equipment, farm equipment), automated factories, aircraft). For example, a radar system such as a multi-input multi-output (MIMO) system may be used for obstacle detection in a car to aid in collision avoidance or other safety systems. Generally, the parameters of the radar system are fixed. These parameters include the detection threshold, field of view (FOV), target prioritization strategy, and operation ranges, for example. Yet, there may be situations in which the radar system performs more effectively based on different parameters. Accordingly, it is desirable to provide dynamic adjustment of radar parameters.

SUMMARY OF THE INVENTION

In one exemplary embodiment of the invention, a method of dynamically adjusting radar parameters of a radar system on a platform includes obtaining inputs including platform parameters, wherein the platform parameters includes speed and braking duration; obtaining a characterization of driving behavior based on the inputs; modifying the radar parameters based on the inputs and the characterization, wherein the modifying includes changing a maximum range; and providing alerts to a driver of the platform based on the radar system.

In another exemplary embodiment, a control system to dynamically adjust radar parameters of a radar system on a platform includes an interface to obtain inputs including platform parameters and a characterization of driving behavior based on the inputs, wherein the platform parameters includes speed and braking duration; a processor configured to modify the radar parameters based on the inputs and the characterization, wherein the radar parameters include maximum range; and an output configured to provide alerts to a driver of the platform based on the radar system.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
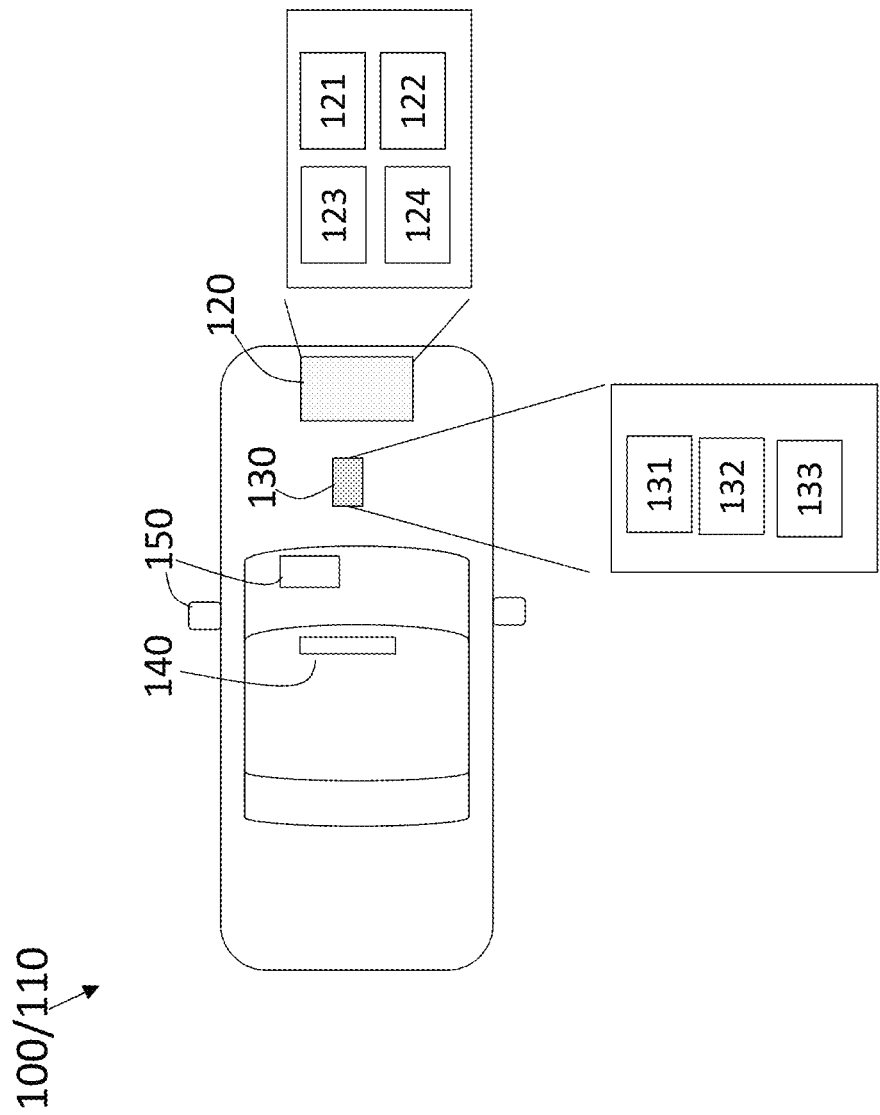
FIG. 1 is a block diagram of a platform with dynamically adjustable radar parameters according to one or more embodiments.

The following description is merely exemplary in nature and is not intended to limit the present disclosure, its application or uses. It should be understood that throughout the drawings, corresponding reference numerals indicate like or corresponding parts and features.

As previously noted, radar systems are used for detection and tracking on various platforms (e.g., vehicles, automated manufacturing facilities). As an example, a MIMO radar system may transmit linear frequency-modulated continuous wave (LFM-CW) signals, referred to as chirp signals. When the radar parameters such as chirp duration, chirp slope, frame length (duration to transmit a chirp from every transmitter of the MIMO radar), and sampling frequency remain constant, the maximum detection range remains constant. Thus, when the vehicle slows to half its original speed, for example, the same range translates to double the original travel time.

According to one or more embodiments of the invention, radar parameters are dynamically adjusted based on a variety of criteria. Thus, for example, when the vehicle speed changes, rather than maintaining a constant maximum detection range, it may be preferable to change resolution or achieve another objective by changing one or more radar parameters. Driving scenarios or driver history, like vehicle speed, may suggest a different set of radar parameters. For example, a driver who has a history of making fast maneuvers may benefit from the vehicle radar parameters being tuned to provide faster warnings, even at the expense of accuracy. On the other hand, a slower, more deliberate driver may benefit from more accurate detection, even if more time (e.g., more sampling) is needed to achieve the accuracy. Detailed embodiments are discussed below.

FIG. 1 is a block diagram of a platform 100 with dynamically adjustable radar parameters according to one or more embodiments. The exemplary platform 100 shown in FIG. 1 is an automobile 110. In alternate embodiments, the platform 100 may be another type of vehicle or an automated manufacturing facility, in which varying conditions call for dynamic changes in the radar performance. The automobile in FIG. 1 includes a radar system 120 whose parameters are dynamically adjusted, as detailed herein. The radar system 120 includes an array of transmit elements 121 and one or more receive elements 122. The radar system 120 may include one or more memory devices 123 and one or more processors 124 and other known components that generate the transmitted signals and process the received reflections. In alternate embodiments, the radar system 120 may share processing resources with a controller 130 of the platform 110.

The controller 130 may include an application specific integrated circuit (ASIC), an electronic circuit, a processor (shared, dedicated, or group) and memory that executes one or more software or firmware programs, a combinational logic circuit, and/or other suitable components that provide the described functionality. The exemplary controller 130 shown in FIG. 1 includes one or more memory devices 131, one or more processors 132, and an interface 133 to communicate with other systems (e.g., the radar system 120, control and monitoring systems) and sensors 140 of the platform. While the controller 130 is shown as a stand-alone component for explanatory purposes, the functionality of the controller 130 may be performed by an electronic control unit (ECU) of an automobile 110, for example, or another processing system.

The controller 130 obtains inputs (e.g., speed, braking rate) from known internal components of the platform 100 and may additionally receive inputs from other sensors 140 of the platform 100. The known components relate to systems that control steering, braking, and acceleration, for example. That is, many automobiles 110, for example, include diagnostic, monitoring, and control systems that monitor braking, steering, speed, lane departures, lane changes, and other driving characteristics. The other sensors 140 may include a camera, lidar system, infrared sensor, and other data gathering systems that indicate both driving conditions and driver behavior. The output of the radar system 120 may be used to provide alerts to the driver on a known instrument panel or mirror display 150. The alert may be haptic or audible, rather than or in addition to being visual. The driver seat or steering wheel may vibrate, for example. The output of the radar system 120 may additionally or alternately be provided to a known vehicle control system (e.g., steering control, automatic braking).

Both driving behavior and driving conditions (e.g., road conditions, traffic congestion) may be used to dynamically modify radar parameters. Different criteria for modifying the radar parameters may be weighted differently. For example, traffic conditions may be weighted more heavily than driver behavior or vice versa. Exemplary criteria and the corresponding desired changed to radar parameters are indicated in Table 1.

TABLE 1

Exemplary criteria for radar parameter modification.

| Criteria Category | Specific Criteria | Modification |
|---|---|---|
| speed | slow speed | increase range resolution |
| | high speed | increase maximum range |
| driving style | frequent maneuvers | low detection threshold |
| | slow acceleration | high detection threshold |
| driver reaction time | fast reaction | high detection threshold |
| | slow reaction | increase maximum range |

Table 1 provides a sampling of the types of criteria and the types of modifications of interest corresponding with the criteria. The criteria are quantified in order to affect radar parameter modification. For example, a threshold speed may be used to adjust the maximum range and range resolution. A set of thresholds may be used to adjust the maximum range and range resolution by varying degrees. Driving style and driver reaction time may be quantified, as well, based on one or more thresholds. For example, the speed at which a brake pedal is depressed may indicate reaction time and driving style. The mechanisms by which the modifications are done are discussed herein.

Each transmit element 121 transmits a linear frequency-modulated continuous wave (LFM-CW) signal (chirp), and the signals from each transmit element 121 may be distinguishable based on a different code transmitted by each. One of the parameters associated with the radar system 120 is bandwidth (BW):

$$BW = chirp\_slope \times chirp\_time \quad [EQ. 1]$$

In EQ. 1, chirp_time is the duration of a chirp or LFM-CW signal and chirp_slope is defined by the minimum and maximum frequencies of the chirp over the chirp_time. By adjusting the bandwidth (BW), the range resolution may be adjusted according to:

$$range\_resolution = \frac{c}{2 \times BW} \quad [EQ. 2]$$

In EQ. 2, c is the speed of light ($3*10^8$ meters/second). The maximum range of the radar system 120 may be modified according to:

$$max\_range = \frac{f_s}{chirp\_slope} \times \frac{c}{2} \quad [EQ. 3]$$

In EQ. 3, $f_s$ is the sampling frequency. The maximum velocity that may be resolved with the radar system 120 is given by:

$$max\_velocity = \frac{1}{chirp\_time} \times \frac{c}{4 \times f_c} \quad [EQ. 4]$$

EQ. 1 through EQ. 4 indicate the interconnectedness of the various parameters. For example, range resolution is inversely proportional to bandwidth (according to EQ. 2), which, in turn, is directly proportional to chirp time (according to EQ. 1). Thus, to increase range resolution, chirp time may be reduced. However, when chirp time is reduced, maximum velocity is also reduced. Thus, the weighting of different criteria facilitates a determination of parameter values when different criteria may suggest contradictory modifications.

Other parameters that may be adjusted include field of view (FOV), which is related to maximum range (e.g., field of view increases as maximum range decreases), and detection threshold. The detection threshold is a minimum level required for the received (decoded) signal to indicate the presence of a target. A low detection threshold increases the possibility of false alarms, but a high detection threshold increases the possibility of a missed detection. For example, when driver behavior is deemed to be aggressive (e.g., quick acceleration, last-minute braking, frequent lane changes), the detection threshold may be lowered so that, even though false alarms may be increased, all potential obstructions are brought to the attention of the driver. Driver behavior may be learned using a neural network or other known learning algorithm. Driver behavior may, instead, be based on a threshold number of maneuvers over a specified period of time. For example, a threshold number of lane changes and fast accelerations and braking may qualify a driver as aggressive and trigger a reduction in the detection threshold. The speed of the automobile 110 may trigger other modifications in parameters such as maximum range.

Figure 2:
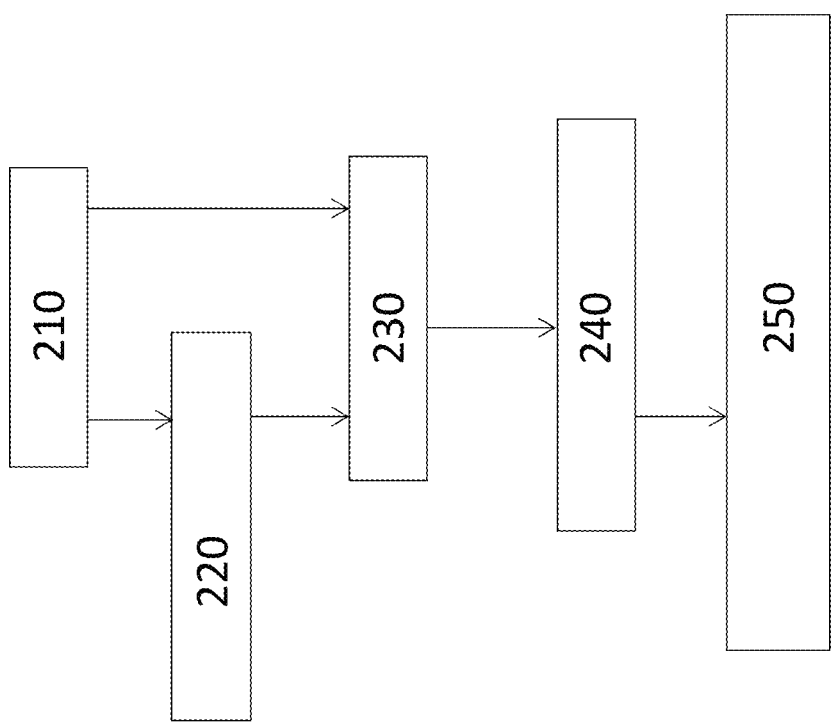
FIG. 2 is as process flow of a method of dynamically adjusting radar parameters according to one or more embodiments.

FIG. 2 is as process flow of a method of dynamically adjusting radar parameters according to one or more embodiments. Most of the processes may be performed by the controller 130 or a combination of the controller 130 and other processing systems of the platform 100. Obtaining inputs, at block 210, includes obtaining platform 100 parameters such as speed and maneuvering from components of the platform 100 such as the speedometer, steering and brake monitor, and other known systems, as noted above. Obtaining inputs also includes obtaining information from other sensors 140. Characterizing driving behavior, at block 220, refers to learning behavior using a learning algorithm or determining behavior based on thresholds, as noted above, to characterize the driving (e.g., aggressive, defensive). The determination may be made periodically or continuously over a specified duration of time. At block 230, weighting criteria is based on the characterization of driving (at block 220) and on the inputs (at block 210) themselves. For example, information obtained from a camera or lidar system regarding traffic may be weighted less than a determination of an aggressive driver. Modifying the parameters of the radar system 120, at block 240, refers to using the weighted criteria to modify parameters such as, for example, detection threshold, chirp time, sampling frequency, maximum range, range resolution, and maximum velocity. At block 250, providing alerts and/or controlling the platform 100 is based on the output of the radar system 120 with the modified parameters. Alerts may be provided on one or more displays 150 of the platform 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of dynamically adjusting radar parameters of a radar system on a platform, the method comprising:
   obtaining inputs including platform parameters, wherein the platform parameters includes speed and braking duration;
   obtaining a characterization of driving behavior based on the inputs;
   modifying the radar parameters based on the inputs and the characterization, wherein the modifying includes changing a maximum range and the inputs and the characterization are weighted to determine modification of the radar parameters; and
   providing alerts to a driver of the platform based on the radar system.

2. The method according to claim 1, wherein the obtaining the inputs includes obtaining information from other sensors, the other sensors including one or more of a camera and a lidar system.

3. The method according to claim 1, wherein the obtaining the characterization of the driving behavior includes characterizing the driving behavior as aggressive.

4. The method according to claim 3, wherein the modifying the radar parameters includes decreasing a detection threshold.

5. The method according to claim 1, wherein the obtaining the characterization of the driving behavior includes characterizing the driving behavior as defensive.

6. The method according to claim 5, wherein the modifying the radar parameters includes increasing a detection threshold.

7. The method according to claim 1, wherein the modifying the radar parameters includes increasing a maximum range based on the speed.

8. The method according to claim 7, wherein the increasing the maximum range includes decreasing a change in frequency over a duration of a linear frequency-modulated continuous wave (LFM-CW) pulse transmitted by the radar system.

9. The method according to claim 1, further comprising controlling the platform based on the radar system.

10. A control system to dynamically adjust radar parameters of a radar system on a platform, the system comprising:
    an interface to obtain inputs including platform parameters and a characterization of driving behavior based on the inputs, wherein the platform parameters includes speed and braking duration;
    a processor configured to modify the radar parameters based on the inputs and the characterization, wherein the radar parameters include maximum range, wherein the processor weights the inputs and the characterization to determine modification of the radar parameters; and
    an output configured to provide alerts to a driver of the platform based on the radar system.

11. The system according to claim 10, wherein the inputs include information from other sensors, the other sensors including one or more of a camera and a lidar system.

12. The system according to claim 10, wherein the characterization of the driving behavior is aggressive.

13. The system according to claim 12, wherein the processor modifies the radar parameters to decrease a detection threshold.

14. The system according to claim 10, wherein the characterization of the driving behavior is defensive.

15. The system according to claim 14, wherein the processor modifies the radar parameters to increase a detection threshold.

16. The system according to claim 10, wherein the processor increases a maximum range based on the speed.

17. The system according to claim 16, wherein the processor increases the maximum range based on decreasing a change in frequency over a duration of a linear frequency-modulated continuous wave (LFM-CW) pulse transmitted by the radar system.

18. The system according to claim 10, wherein the platform is an automobile, and the processor controls the automobile based on the radar system.

\* \* \* \* \*